(12) United States Patent
Xiang et al.

(10) Patent No.: US 12,105,217 B2
(45) Date of Patent: Oct. 1, 2024

(54) METHOD, DEVICE AND SYSTEM FOR DETERMINING RELATIVE ANGLE BETWEEN INTELLIGENT DEVICES

(71) Applicant: SUZHOU TOUCHAIR TECHNOLOGY CO., LTD., Jiangsu (CN)

(72) Inventors: Weichen Xiang, Jiangsu (CN); Guangsong Liu, Jiangsu (CN)

(73) Assignee: SUZHOU TOUCHAIR TECHNOLOGY CO., LTD., Suzhou (CN)

( * ) Notice: Subject to any disclaimer, the term of this patent is extended or adjusted under 35 U.S.C. 154(b) by 120 days.

(21) Appl. No.: 17/869,772

(22) Filed: Jul. 20, 2022

(65) Prior Publication Data

US 2022/0365166 A1    Nov. 17, 2022

Related U.S. Application Data

(63) Continuation of application No. PCT/CN2020/137436, filed on Dec. 18, 2020.

(30) Foreign Application Priority Data

Jan. 20, 2020    (CN) .......................... 202010063211.5

(51) Int. Cl.
*G01S 5/30*    (2006.01)
*G10L 25/03*    (2013.01)
*G10L 25/51*    (2013.01)

(52) U.S. Cl.
CPC ................ *G01S 5/30* (2013.01); *G10L 25/03* (2013.01); *G10L 25/51* (2013.01)

(58) Field of Classification Search
CPC ............ G01S 5/30; G10L 25/03; G10L 25/51
See application file for complete search history.

(56) References Cited

U.S. PATENT DOCUMENTS

| | | | |
|---|---|---|---|
| 2015/0003206 A1* | 1/2015 | Inada ...................... | G01S 5/186 367/99 |
| 2019/0293746 A1* | 9/2019 | Lee ........................... | G01S 5/18 |
| 2021/0354310 A1* | 11/2021 | Shin ....................... | B25J 11/008 |

FOREIGN PATENT DOCUMENTS

| | | |
|---|---|---|
| CN | 103069468 A | 4/2013 |
| CN | 104422922 A | 3/2015 |
| KR | 20190104950 A | 9/2019 |

OTHER PUBLICATIONS

International Search Report of PCT Patent Application No. PCT/CN2020/137436 issued on Mar. 17, 2021.

* cited by examiner

*Primary Examiner* — Isam A Alsomiri
*Assistant Examiner* — Abdallah Abulaban

(57) ABSTRACT

The present application provides a method, device and system for determining a relative angle between intelligent devices, and intelligent devices. The method is applicable to a first intelligent device. The first intelligent device includes a first sound detection module and a second sound detection module. The relative angle between intelligent devices can be determined quickly, simply, conveniently and accurately.

24 Claims, 11 Drawing Sheets

METHOD, DEVICE AND SYSTEM FOR DETERMINING RELATIVE ANGLE BETWEEN INTELLIGENT DEVICES

CROSS REFERENCE TO RELATED APPLICATIONS

The present application is a Continuation Application of PCT Application No. PCT/CN2020/137436 filed on Dec. 18, 2020, which claims the benefit of Chinese Patent Application No. 202010063211.5 filed on Jan. 20, 2020. All the above are hereby incorporated by reference in their entirety.

TECHNICAL FIELD

The present application relates to the technical field of positioning, in particular to a method, device and system for determining a relative angle between intelligent devices, and intelligent devices.

BACKGROUND

With the use of 5G and other radio communication technologies, the global process of building the Internet of Things is also accelerating, and location services are the infrastructure of the Internet of Things. Location services will penetrate into many Internet of Things application scenarios to make people and things perceive each other. Therefore, it is necessary to explore the technology and application based on mutual positioning between intelligent devices, realize the connection between people and people, between people and things, and between things and things, and improve the intelligence and humanization of work, social and other scenarios.

At present, the mutual positioning between intelligent devices is generally realized based on Global Navigation Satellite System (GNSS). However, GNSS has low positioning accuracy and can hardly be used indoors. In addition, WiFi technology and Bluetooth technology cannot accurately determine the relative position of intelligent devices, and it is also necessary to repeatedly test and compare the actual distance to obtain the signal strength and environmental attenuation factor at distance of one meter far away from a Bluetooth device. Therefore, it is not reliable. At present, the existing technology is not universal for the basic location services of intelligent devices in some small space scenarios.

SUMMARY

The present application provides a method, device and system for determining a relative angle between intelligent devices, and intelligent devices.

The present application adopts the following technical solution:

A method for determining a relative angle between intelligent devices, wherein the method is applicable to a first intelligent device, the first intelligent device includes a first sound detection module and a second sound detection module, and the method includes:
enabling the first sound detection module to detect a first sound signal sent by a second intelligent device and directly reaching the first sound detection module, and enabling the second sound detection module to detect a second sound signal sent by the second intelligent device and directly reaching the second sound detection module, wherein the first sound signal and the second sound signal are sent by the second intelligent device at the same time;
determining a time difference between the receiving time of the first sound signal and the receiving time of the second sound signal;
determining a relative angle between the first intelligent device and the second intelligent device based on the distance between the first sound detection module and the second sound detection module and the time difference.

In one embodiment, the step of determining the relative angle between the first intelligent device and the second intelligent device includes:
determining θ based on $$\theta = \arcsin\left(\frac{d}{D}\right),$$

where arcsin is an inverse sine function, d=t*c, t is the time difference, c is the propagation speed of sound, and D is the distance between the first sound detection module and the second sound detection module;
determining the relative angle φ between the first intelligent device and the second intelligent device based on θ, where $$\varphi = \frac{\pi}{2} - \theta.$$

In one embodiment, the method further includes:
determining a sound signal with strength greater than a predetermined threshold within a predetermined time window in a sound signal stream sent by the second intelligent device and received by the first sound detection module as the first sound signal;
determining a sound signal with strength greater than the predetermined threshold within the predetermined time window in a sound signal stream sent by the second intelligent device and received by the second sound detection module as the second sound signal.

In one embodiment, the method further includes:
determining sound signals with strength greater than a predetermined threshold in a sound signal stream sent by the second intelligent device and detected by the first sound detection module to form a first candidate signal set;
determining sound signals with strength greater than the predetermined threshold in a sound signal stream sent by the second intelligent device and detected by the second sound detection module to form a second candidate signal set;
determining a respective time difference between the receiving time of each sound signal in the first candidate signal set and the receiving time of each sound signal in the second candidate signal set;
determining a pair of sound signals with the time difference smaller than M as the first sound signal and the second sound signal, where M=(D/c), D is the distance between the first sound detection module and the second sound detection module, and c is the propagation speed of sound.

In one embodiment, the first sound signal and the second sound signal are ultrasonic waves in a code division multiple access format and include a media access control address of the second intelligent device.

A method for determining a relative angle between intelligent devices, wherein the method is applicable to a first intelligent device, the first intelligent device includes a first sound detection module and a second sound detection module, and the method includes:

determining first time that an ultrasonic signal sent by a second intelligent device directly reaches the first sound detection module;

determining second time that the ultrasonic signal directly reaches the second sound detection module;

determining a time difference between the first time and the second time;

determining a relative angle between the first intelligent device and the second intelligent device based on the distance between the first sound detection module and the second sound detection module and the time difference.

In one embodiment, the step of determining the relative angle between the first intelligent device and the second intelligent device includes: determining θ based on $$\theta = \arcsin\left(\frac{d}{D}\right),$$

where arcsin is an inverse sine function, d=t*c, t is the time difference, c is the propagation speed of sound, and D is the distance between the first sound detection module and the second sound detection module; determining the relative angle φ between the first intelligent device and the second intelligent device based on θ, where $$\varphi = \frac{\pi}{2} - \theta.$$

In one embodiment, the method further includes:

determining an ultrasonic signal with strength greater than a predetermined threshold within a predetermined time window in an ultrasonic signal stream sent by the second intelligent device and received by the first sound detection module as the ultrasonic sound signal directly reaching the first sound detection module, and determining the time of receiving the ultrasonic signal directly reaching the first sound detection module as the first time; determining an ultrasonic signal with strength greater than the predetermined threshold within the predetermined time window in an ultrasonic signal stream sent by the second intelligent device and received by the second sound detection module as the ultrasonic sound signal directly reaching the second sound detection module, and determining the time of receiving the ultrasonic signal directly reaching the second sound detection module as the second time; or determining ultrasonic signals with strength greater than a predetermined threshold in an ultrasonic signal stream sent by the second intelligent device and detected by the first sound detection module to form a first candidate signal set; determining ultrasonic signals with strength greater than the predetermined threshold in an ultrasonic signal stream sent by the second intelligent device and detected by the second sound detection module to form a second candidate signal set; determining a respective time difference between the receiving time of each ultrasonic signal in the first candidate signal set and the receiving time of each ultrasonic signal in the second candidate signal set; determining the receiving time of a pair of ultrasonic signals with the time difference smaller than M as the first time and the second time, where M=(D/c), D is the distance between the first sound detection module and the second sound detection module, and c is the propagation speed of sound.

An intelligent device, wherein the intelligent device includes:

a first sound detection module configured to detect a first sound signal sent by a second intelligent device and directly reaching the first sound detection module;

a second sound detection module configured to detect a second sound signal sent by the second intelligent device and directly reaching the second sound detection module, wherein the first sound signal and the second sound signal are sent by the second intelligent device at the same time;

a control module configured to determine a time difference between the receiving time of the first sound signal and the receiving time of the second sound signal, and determine a relative angle between the first intelligent device and the second intelligent device based on the distance between the first sound detection module and the second sound detection module and the time difference.

In one embodiment, the control module is configured to determine θ based on $$\theta = \arcsin\left(\frac{d}{D}\right),$$

where arcsin is an inverse sine function, d=t*C t is the time difference, c is the propagation speed of sound, and D is the distance between the first sound detection module and the second sound detection module; determine the relative angle φ between the first intelligent device and the second intelligent device based on θ, where $$\varphi = \frac{\pi}{2} - \theta.$$

In one embodiment, the control module is configured to determine a sound signal with strength greater than a predetermined threshold within a predetermined time window in a sound signal stream sent by the second intelligent device and received by the first sound detection module as the first sound signal; determine a sound signal with strength greater than the predetermined threshold within the predetermined time window in a sound signal stream sent by the second intelligent device and received by the second sound detection module as the second sound signal.

In one embodiment, the control module is configured to determine sound signals with strength greater than a predetermined threshold in a sound signal stream sent by the second intelligent device and detected by the first sound detection module to form a first candidate signal set; determine sound signals with strength greater than the predetermined threshold in a sound signal stream sent by the second intelligent device and detected by the second sound detection module to form a second candidate signal set; determine a respective time difference between the receiving time of each sound signal in the first candidate signal set and the receiving time of each sound signal in the second candidate signal set; determine a pair of sound signals with the time difference smaller than M as the first sound signal and the second sound signal, where M=(D/c), D is the distance between the first sound detection module and the second sound detection module, and c is the propagation speed of sound.

In one embodiment, the first sound signal and the second sound signal are ultrasonic waves in a code division multiple access format and include a media access control address of the second intelligent device.

In one embodiment, the first sound detection module and the second sound detection module are respectively disposed at two opposite ends of the intelligent device in a length direction, width direction or height direction; the intelligent device includes at least one of an intelligent phone, a tablet PC, an intelligent watch, an intelligent bracelet, an intelligent speaker, an intelligent TV, an intelligent earphone, and an intelligent robot.

A device for determining a relative angle between intelligent devices, wherein the device is applicable to a first intelligent device, and the device includes:
  an enabling module configured to enable a first sound detection module to detect a first sound signal sent by a second intelligent device and directly reaching the first sound detection module, and enable a second sound detection module to detect a second sound signal sent by the second intelligent device and directly reaching the second sound detection module, wherein the first sound signal and the second sound signal are sent by the second intelligent device at the same time;
  a time difference determination module configured to determine a time difference between the receiving time of the first sound signal and the receiving time of the second sound signal;
  an angle determination module configured to determine a relative angle between the first intelligent device and the second intelligent device based on the distance between the first sound detection module and the second sound detection module and the time difference.

In one embodiment, the angle determination module is configured to determine θ based on $$\theta = \arcsin\left(\frac{d}{D}\right),$$

where arcsin is an inverse sine function, d=t*c, t is the time difference, c is the propagation speed of sound, and D is the distance between the first sound detection module and the second sound detection module; determine the relative angle φ between the first intelligent device and the second intelligent device based on θ, where $$\varphi = \frac{\pi}{2} - \theta.$$

In one embodiment, the enabling module is configured to:
  determine a sound signal with strength greater than a predetermined threshold within a predetermined time window in a sound signal stream sent by the second intelligent device and received by the first sound detection module as the first sound signal; determine a sound signal with strength greater than the predetermined threshold within the predetermined time window in a sound signal stream sent by the second intelligent device and received by the second sound detection module as the second sound signal; or
  determine sound signals with strength greater than a predetermined threshold in a sound signal stream sent by the second intelligent device and detected by the first sound detection module to form a first candidate signal set; determine sound signals with strength greater than the predetermined threshold in a sound signal stream sent by the second intelligent device and detected by the second sound detection module to form a second candidate signal set; determine a respective time difference between the receiving time of each sound signal in the first candidate signal set and the receiving time of each sound signal in the second candidate signal set; determine a pair of sound signals with the time difference smaller than M as the first sound signal and the second sound signal, where M=(D/c), D is the distance between the first sound detection module and the second sound detection module, and c is the propagation speed of sound.

A system for determining a relative angle between intelligent devices, wherein the system includes:
  a second intelligent device configured to send an ultrasonic signal;
  a first intelligent device including a first sound detection module and a second sound detection module, and configured to determine first time that the ultrasonic signal directly reaches the first sound detection module; determine second time that the ultrasonic signal directly reaches the second sound detection module; determine a time difference between the first time and the second time; determine a relative angle between the first intelligent device and the second intelligent device based on the distance between the first sound detection module and the second sound detection module and the time difference.

An intelligent device, wherein the intelligent device includes a processor, a memory and a computer program stored on the memory and running on the processor, and the computer program, when executed by the processor, implements the method for determining a relative angle between intelligent devices.

A computer-readable storage medium, wherein a computer program is stored on the computer-readable storage medium, and the computer program, when executed by a processor, implements the method for determining a relative angle between intelligent devices.

From the above technical solution, it can be seen that, in the present application, the method includes enabling the first sound detection module to detect a first sound signal sent by a second intelligent device and directly reaching the first sound detection module, and enabling the second sound detection module to detect a second sound signal sent by the second intelligent device and directly reaching the second sound detection module, wherein the first sound signal and the second sound signal are sent by the second intelligent device at the same time; determining a time difference between the receiving time of the first sound signal and the receiving time of the second sound signal; determining a relative angle between the first intelligent device and the second intelligent device based on the distance between the first sound detection module and the second sound detection module and the time difference. Therefore, the present application can realize the positioning of the relative angle between intelligent devices without adding additional hardware.

In addition, the present application can determine the directly reaching signal from a plurality of received signals (including reflected signals), thus ensuring the accuracy of angle calculation.

Moreover, the present application makes the relative angle positioning universal, and devices produced by different manufacturers can realize interoperability and compatibility.

DESCRIPTION OF THE EMBODIMENTS

In order to make the purposes, technical solutions and advantages of the present application more clear, the present application will be further described below in detail with reference to the drawings.

For the purpose of concise and intuitive description, the solutions of the present application will be described below by describing several representative embodiments. A large number of details in the embodiments are only used to help understand the solutions of the present application. However, it is very obvious that the implementation of the technical solutions of the present application cannot be limited to these details. In order to avoid unnecessarily blurring the solutions of the present application, some embodiments are not described in detail, but only the framework is given. Hereinafter, "including" refers to "including but not limited to" and "according to . . ." refers to "at least according to . . . , but not limited to . . . ". Due to the language habits of Chinese, when the number of a component is not specifically pointed out, it means that the number of the component may be one or more, or may be understood as at least one.

In order to realize the positioning of the relative direction between intelligent devices by using software without adding additional hardware, so that the relative positioning has universality, the devices produced by different manufacturers can realize interoperability and compatibility, and the innovative application of intelligent devices can be explored based on this, the embodiment of the present application provides a solution of identifying a relative direction between intelligent devices based on sound (preferably ultrasound), without adding additional hardware, which can realize the identification of the relative direction between two intelligent devices by using software, and can achieve the effect that the positioning result is accurate and reliable.

First of all, intelligent device refers to any kind of device, instrument or machine having a computing and processing capacity.

Figure 1:
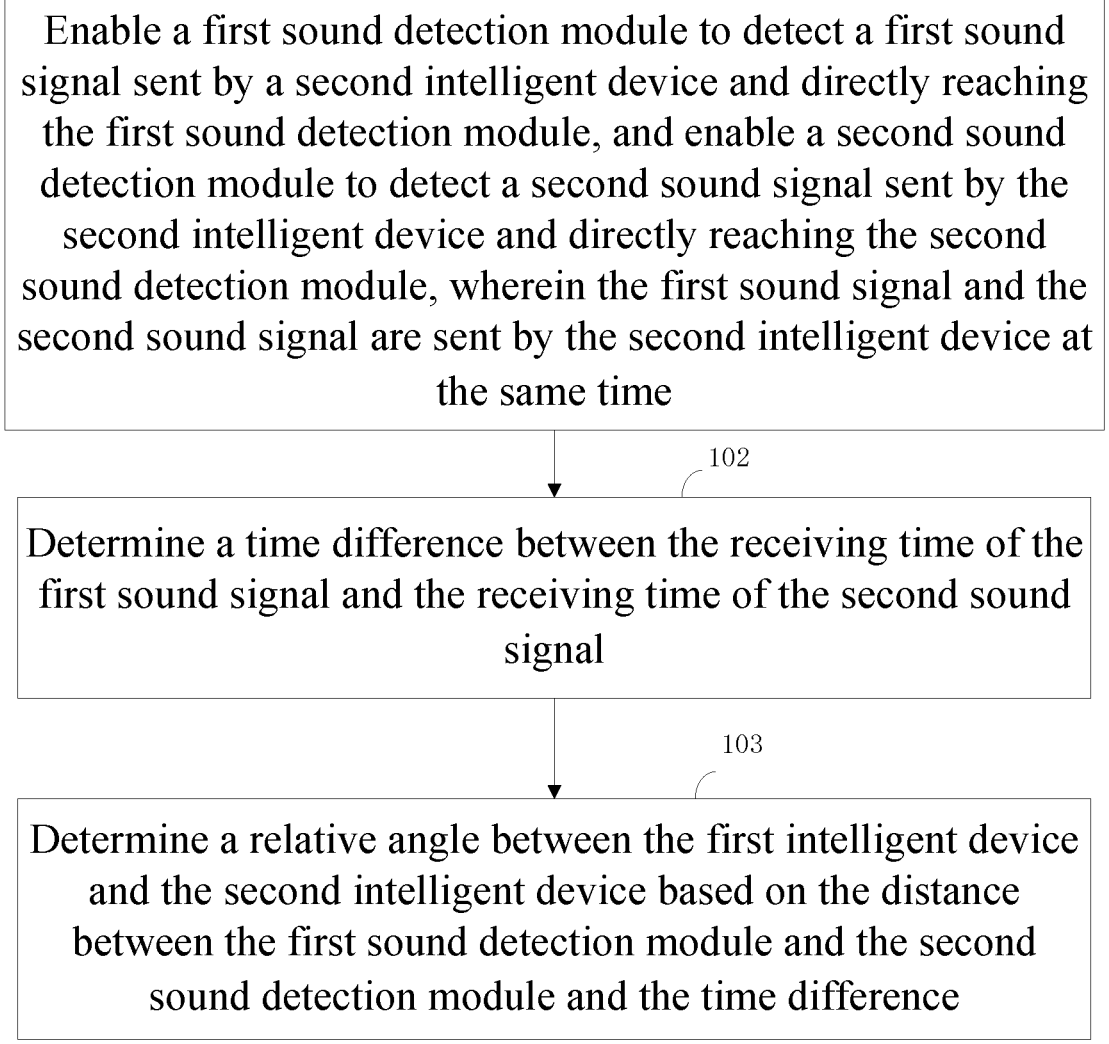
FIG. 1 illustrates an exemplary flowchart of a method for determining a relative angle between intelligent devices according to the present application.

FIG. 1 illustrates an exemplary flowchart of a method for determining a relative angle between intelligent devices according to the present application. The method is applicable to a first intelligent device. The first intelligent device includes a first sound detection module and a second sound detection module.

The first sound detection module and the second sound detection module are fixedly mounted in the first intelligent device. For example, the first sound detection module may be implemented as a microphone or a group of microphone arrays disposed in the first intelligent device. Similarly, the second sound detection module may be implemented as a microphone or a group of microphone arrays disposed in the first intelligent device, which is different from the first sound detection module.

Referring to FIG. 1, the method includes the following steps:

In step 101, the first sound detection module is enabled to detect a first sound signal sent by a second intelligent device and directly reaching the first sound detection module and the second sound detection module is enabled to detect a second sound signal sent by the second intelligent device and directly reaching the second sound detection module. The first sound signal and the second sound signal are sent by the second intelligent device at the same time;

Here, the second intelligent device can send one sound signal or send a plurality of sound signals at the same time.

For example, when the second intelligent device sends one sound signal, the first sound detection module and the second sound detection module in the second intelligent device detect the sound signal respectively. A detection signal detected by the first sound detection module and directly reaching the first sound detection module in the sound signal is determined as the first sound signal; a detection signal detected by the second sound detection module and directly reaching the first sound detection module in the sound signal is determined as the second sound signal.

For another example, when the second intelligent device sends a plurality of sound signals at the same time, for example, an ultrasonic signal and an audible sound signal. The first sound detection module in the second intelligent device is adapted to detect the ultrasonic signal, and the second sound detection module is adapted to detect the audible sound signal. The first sound detection module detects the ultrasonic signal, and the second sound detection module detects the audible sound signal. A detection signal detected by the first sound detection module and directly reaching the first sound detection module in the ultrasonic signal is determined as the first sound signal. A detection signal detected by the second sound detection module and directly reaching the second sound detection module in the audible sound signal is determined as the second sound signal.

In other words, the first sound signal and the second sound signal may be respective detection signals detected by the first sound detection module and the second sound detection module aiming at the same sound signal sent by the second intelligent device. Alternatively, the first sound signal and the second sound signal may be respective detection signals detected by the first sound detection module and the second sound detection module aiming at different sound signals sent by the second intelligent device at the same time.

In step 102, a time difference between the receiving time of the first sound signal and the receiving time of the second sound signal is determined. For example, this time difference is t, t=t1-t2, t1 is the receiving time of the first sound signal, and t2 is the receiving time of the second sound signal.

Here, the first intelligent device (for example, CPU in the first intelligent device) can record the receiving time of the first sound signal and the receiving time of the second sound signal, and calculate the time difference between the two.

In step 103, a relative angle between the first intelligent device and the second intelligent device is determined based on the distance between the first sound detection module and the second sound detection module and the time difference.

For example, step 103 may be executed by the CPU of the first intelligent device.

In one embodiment, the step 103 of determining the relative angle between the first intelligent device and the second intelligent device includes: determining θ based on $$\theta = \arcsin\left(\frac{d}{D}\right),$$

where arcsin is an inverse sine function, d=t*C t is the time difference, c is the propagation speed of sound, and D is the distance between the first sound detection module and the second sound detection module; determining the relative angle φ between the first intelligent device and the second intelligent device based on θ, where $$\varphi = \frac{\pi}{2} - \theta.$$

The value of the time difference determined in step 102 may be positive or negative. When the value of the time difference is positive, the receiving time of the second sound signal is earlier than the receiving time of the first sound signal, so the relative angle between the first intelligent device and the second intelligent device is usually an acute angle. When the value of the time difference is negative, the receiving time of the first sound signal is earlier than the receiving time of the second sound signal, so the relative angle between the first intelligent device and the second intelligent device is usually an obtuse angle.

In the embodiment of the present application, the first sound signal is a signal sent by the second intelligent device and directly reaching the first sound detection module, and the second sound signal is a signal sent by the second intelligent device and directly reaching the second sound detection module. In fact, either the first sound detection module or the second sound detection module may receive a non-directly reaching signal sent by the second intelligent device (for example, one reflection or multiple transmissions through an obstacle). Therefore, how to determine a directly reaching signal from the received signals is of great significance.

As found by the applicant, generally, the signal stream received by each sound detection module includes a directly reaching channel and a reflection channel. The directly reaching channel can be determined simply and conveniently according to the following principle: among all signals detected by the sound detection module, the signal strength of the directly reaching channel is generally the highest.

Therefore, in one embodiment, the method further includes: determining a sound signal with strength greater than a predetermined threshold within a predetermined time window in a sound signal stream sent by the second intelligent device and received by the first sound detection module as the first sound signal; determining a sound signal with strength greater than the predetermined threshold within the predetermined time window in a sound signal stream sent by the second intelligent device and received by the second sound detection module as the second sound signal.

Figure 4:
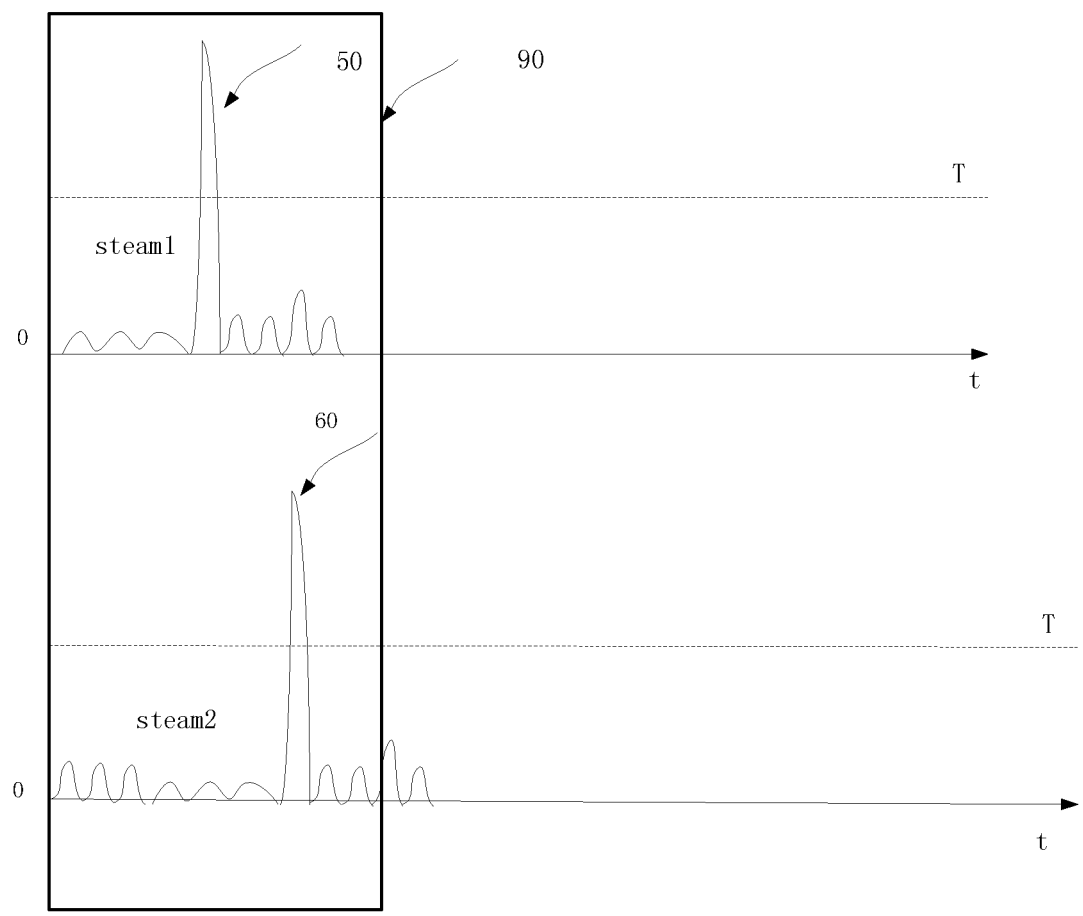
FIG. 4 illustrates a first exemplary schematic diagram of determining a pair of directly reaching signals according to the present application.

FIG. 4 illustrates a first exemplary schematic diagram of determining a pair of directly reaching signals according to the present application.

In FIG. 4, the sound signal stream detected by the first sound detection module is stream 1, which includes a plurality of pulse signals changing with time (t), and the predetermined signal strength threshold is T. It can be seen that within the range of time window 90, the signal strength of pulse signal 50 in stream 1 is greater than the threshold T. The sound signal stream detected by the second sound detection module is stream 2, which includes a plurality of pulse signals changing with time (t), and the predetermined signal strength threshold is also T. It can be seen that within the range of time window 90, the signal strength of pulse signal 60 in stream 2 is greater than the threshold T. Therefore, it is determined that pulse signal 50 is the first sound signal and pulse signal 60 is the second sound signal.

In addition, as further found by the applicant, the directly reaching channel can be accurately determined by comprehensively considering the following two principles: principle (1): among all signals detected by the sound detection module, the signal strength of the directly reaching channel is generally the highest; principle (2): joint determination method: the distance difference d obtained through conversion from the reaching time difference between the two directly reaching channel signals (the first sound signal and the second sound signal) shall not be greater than the distance between the first sound detection module and the second sound detection module.

Therefore, in one embodiment, the method further includes: determining sound signals with strength greater than a predetermined threshold in a sound signal stream sent by the second intelligent device and detected by the first sound detection module to form a first candidate signal set; determining sound signals with strength greater than the predetermined threshold in a sound signal stream sent by the second intelligent device and detected by the second sound detection module to form a second candidate signal set; determining a respective time difference between the receiving time of each sound signal in the first candidate signal set and the receiving time of each sound signal in the second candidate signal set; determining a pair of sound signals with the time difference smaller than M as the first sound signal and the second sound signal, where M=(D/c), D is the distance between the first sound detection module and the second sound detection module, and c is the propagation speed of sound.

Figure 5:
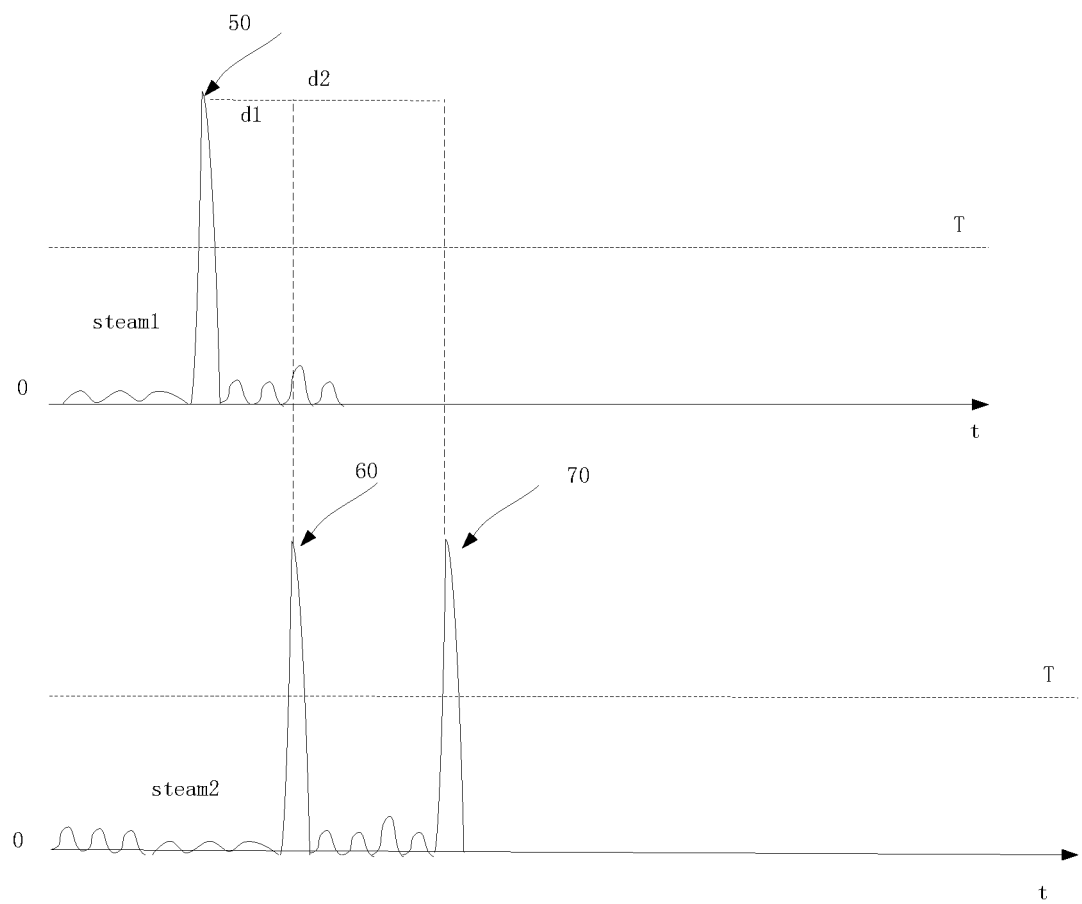
FIG. 5 illustrates a second exemplary schematic diagram of determining a pair of directly reaching signals according to the present application.

FIG. 5 illustrates a second exemplary schematic diagram of determining a pair of directly reaching signals according to the present application.

In FIG. 5, the sound signal stream detected by the first sound detection module is stream 1, which includes a plurality of pulse signals changing with time (t), and the predetermined signal strength threshold value is T. It can be seen that in stream 1, the signal strength of pulse signal 50 is greater than the threshold T, so the first candidate signal set includes pulse signal 50. The sound signal stream detected by the second sound detection module is stream 2, which includes a plurality of pulse signals changing with time (t), and the predetermined signal strength threshold value is also T. It can be seen that in stream 2, the signal strength of pulse signal 60 and pulse signal 70 is greater than the threshold T, so the second candidate signal set includes pulse signal 60 and pulse signal 70.

Further, a time difference d1 between the receiving time of pulse signal 50 in the first candidate signal set and the receiving time of pulse signal 60 in the second candidate signal set is determined, and a time difference d2 between the receiving time of pulse signal 50 in the first candidate signal set and the receiving time of pulse signal 70 in the second candidate signal set is determined. It is assumed that d1 is smaller than M and d2 is greater than M, where M=(D/c), D is the distance between the first sound detection module and the second sound detection module, and c is the propagation speed of sound. Therefore, pulse signal 50 in a pair of sound signals related to d1 is determined as the first sound signal and pulse signal 60 is determined as the second sound signal.

Exemplarily, the first sound signal and the second sound signal are ultrasonic waves in a code division multiple access format and include a Media Access Control (MAC) address of the second intelligent device.

Therefore, the first intelligent device can accurately identify the source of the sound signal based on the MAC address of the second intelligent device included in the sound signal. When there are multiple sound sources sending sound signals in the environment, the first intelligent device can accurately use two directly reaching signals from the same sound source to determine the relative angle with respect to the sound source based on extracting the MAC address in the sound signal, without being interfered by other sound sources.

The present application further provides a method for determining a relative angle between intelligent devices. The method is applicable to a first intelligent device. The first intelligent device includes a first sound detection module and a second sound detection module. The method includes: determining first time that an ultrasonic signal sent by a second intelligent device directly reaches the first sound detection module; determining second time that the ultrasonic signal directly reaches the second sound detection module; determining a time difference between the first time and the second time; determining a relative angle between the first intelligent device and the second intelligent device based on the distance between the first sound detection module and the second sound detection module and the time difference.

In one embodiment, the step of determining the relative angle between the first intelligent device and the second intelligent device includes: determining θ based on $$\theta = \arcsin\left(\frac{d}{D}\right),$$

where arcsin is an inverse sine function, d=t*c, t is the time difference, c is the propagation speed of sound, and D is the distance between the first sound detection module and the second sound detection module; determining the relative angle φ between the first intelligent device and the second intelligent device based on θ, where $$\varphi = \frac{\pi}{2} - \theta.$$

In one embodiment, the method further includes at least one of the following processes:

(1) determining an ultrasonic signal with strength greater than a predetermined threshold within a predetermined time window in an ultrasonic signal stream sent by the second intelligent device and received by the first sound detection module as the ultrasonic sound signal directly reaching the first sound detection module, and determining the time of receiving the ultrasonic signal directly reaching the first sound detection module as the first time; determining an ultrasonic signal with strength greater than the predetermined threshold within the predetermined time window in an ultrasonic signal stream sent by the second intelligent device and received by the second sound detection module as the ultrasonic sound signal directly reaching the second sound detection module, and determining the time of receiving the ultrasonic signal directly reaching the second sound detection module as the second time;

(2) determining ultrasonic signals with strength greater than a predetermined threshold in an ultrasonic signal stream sent by the second intelligent device and detected by the first sound detection module to form a first candidate signal set; determining ultrasonic signals with strength greater than the predetermined threshold in an ultrasonic signal stream sent by the second intelligent device and detected by the second sound detection module to form a second candidate signal set; determining a respective time difference between the receiving time of each ultrasonic signal in the first candidate signal set and the receiving time of each ultrasonic signal in the second candidate signal set; determining the receiving time of a pair of ultrasonic signals with the time difference smaller than M as the first time and the second time, where M=(D/c), D is the distance between the first sound detection module and the second sound detection module, and c is the propagation speed of sound.

Next, the principle and calculation process of relative positioning in the present application will be exemplarily described.

Figure 2:
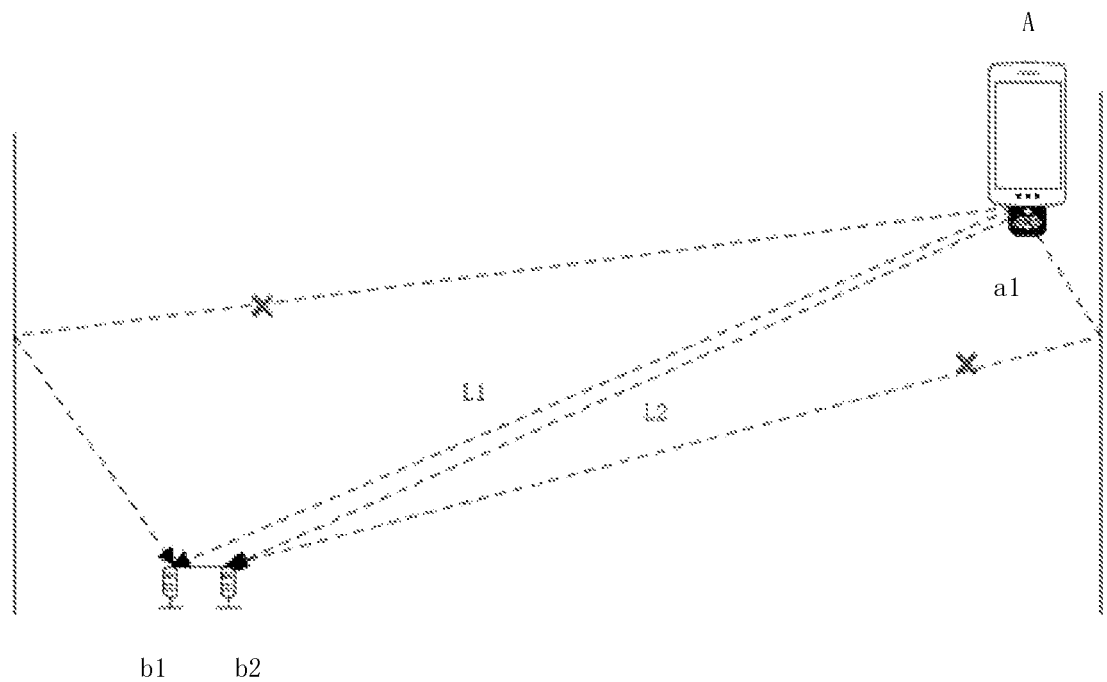
FIG. 2 illustrates a schematic diagram of determining a relative angle between intelligent devices according to the present application.
Figure 3:
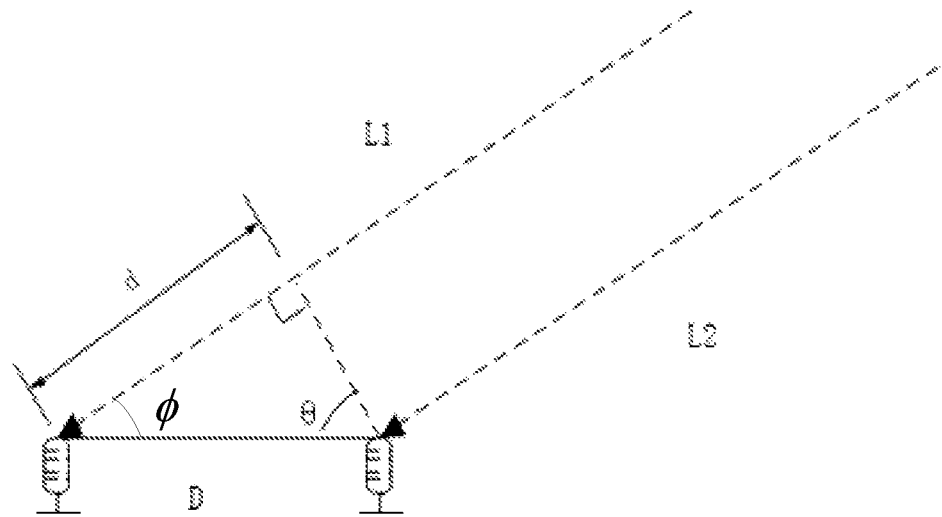
FIG. 3 illustrates a schematic diagram of calculating a relative angle between intelligent devices according to the present application.

FIG. 2 illustrates a schematic diagram of determining a relative angle between intelligent devices according to the present application. FIG. 3 illustrates a schematic diagram of calculating a relative angle between intelligent devices according to the present application.

Referring to FIG. 2, a microphone a1 disposed at a bottom of an intelligent device A transmits an ultrasonic signal, which includes an MAC address of the intelligent device A. An intelligent device B (not shown in FIG. 2) has two microphones disposed apart, namely microphone b1 and microphone b2. The microphone b1 receives a directly reaching signal $L_1$ in the ultrasonic signal, and the microphone b2 receives a directly reaching signal $L_2$ in the ultrasonic signal. Non-directly reaching signals reaching the microphone b1 and the microphone b2 after the ultrasonic signal is reflected by an obstacle do not participate in the subsequent relative angle calculation.

Due to the small size of intelligent devices, especially when the two intelligent devices are far apart, the directly reaching signals $L_1$ and $L_2$ can be regarded as parallel lines.

Referring to FIG. 3, $L_1$ and $L_2$ respectively represent the directly reaching signals (not the signals reflected by the obstacle) received by the microphone b1 and the microphone b2 of the intelligent device B; D is the distance between the microphone b1 and the microphone b2; for example, if the microphone b1 and the microphone b2 are respectively disposed at the upper and lower ends of the intelligent device B, D may be the length of the intelligent device B; d is the distance difference between $L_1$ and $L_2$, the delay time difference t of the directly reaching signal $L_1$ relative to the directly reaching signal $L_2$ can be determined by using the relevant calculation method of signals, d can be calculated based on the delay time difference t, where d=t*c, c is the propagation speed of sound in the medium (such as air); θ is an auxiliary angle, where $$\theta = \arcsin\left(\frac{d}{D}\right).$$

Therefore, the relative angle between the intelligent device A and the intelligent device B can be calculated, where $$\varphi = \frac{\pi}{2} - \theta.$$

Exemplarily, the intelligent device A and the intelligent device B may be implemented as at least one of an intelligent phone, a tablet PC, an intelligent watch, an intelligent bracelet, an intelligent speaker, an intelligent TV, an intelligent earphone, an intelligent robot, etc.

The first sound detection module and the second sound detection module may be disposed at a plurality of positions of the intelligent device.

Figure 6:
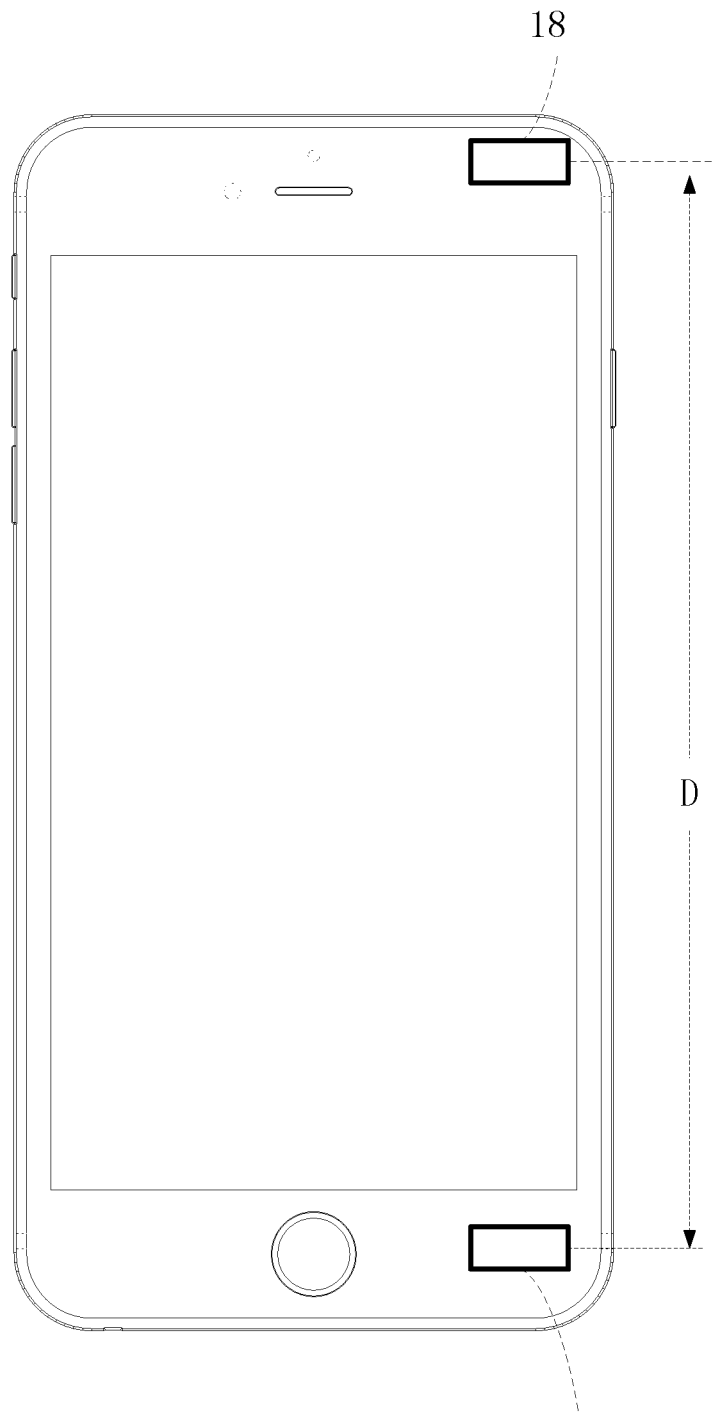
FIG. 6 illustrates a first exemplary arrangement diagram of a first sound detection module and a second sound detection module in an intelligent device according to the present application.

FIG. 6 illustrates a first exemplary arrangement diagram of a first sound detection module and a second sound detection module in an intelligent device according to the present application. In FIG. 6, a first sound detection module 18 and a second sound detection module 19 are respectively disposed at two ends of the intelligent device in a length direction. Therefore, the length D of the intelligent device can be directly determined as the distance between the first sound detection module 18 and the second sound detection module 19.

Figure 7:
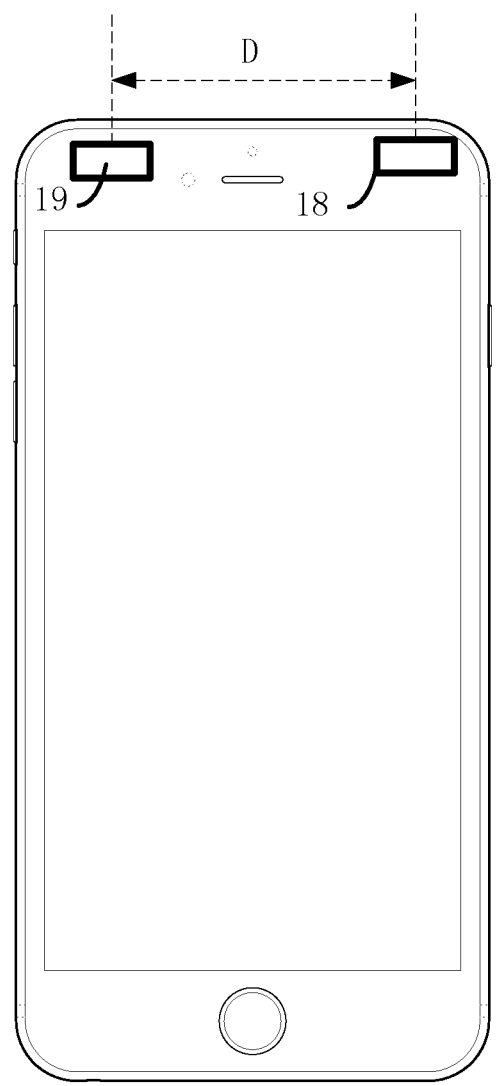
FIG. 7 illustrates a second exemplary arrangement diagram of a first sound detection module and a second sound detection module in an intelligent device according to the present application.

FIG. 7 illustrates a second exemplary arrangement diagram of a first sound detection module and a second sound detection module in an intelligent device according to the present application. In FIG. 7, a first sound detection module 18 and a second sound detection module 19 are respectively disposed at two ends of the intelligent device in a width direction. Therefore, the width D of the intelligent device can be directly determined as the distance between the first sound detection module 18 and the second sound detection module 19.

The above exemplarily describes the arrangement diagrams of the first sound detection module and the second sound detection module in the intelligent device. Those skilled in the art can realize that this description is only exemplary and is not used to limit the scope of protection of the present application.

In fact, at present, an intelligent device usually has two microphones, which can be applied as the first sound detection module and the second sound detection module in the embodiment of the present without changing the intelligent device in hardware.

A typical example of using ultrasound to calculate the relative angle between intelligent devices based on the embodiment of the present application will be described below.

Figure 8:
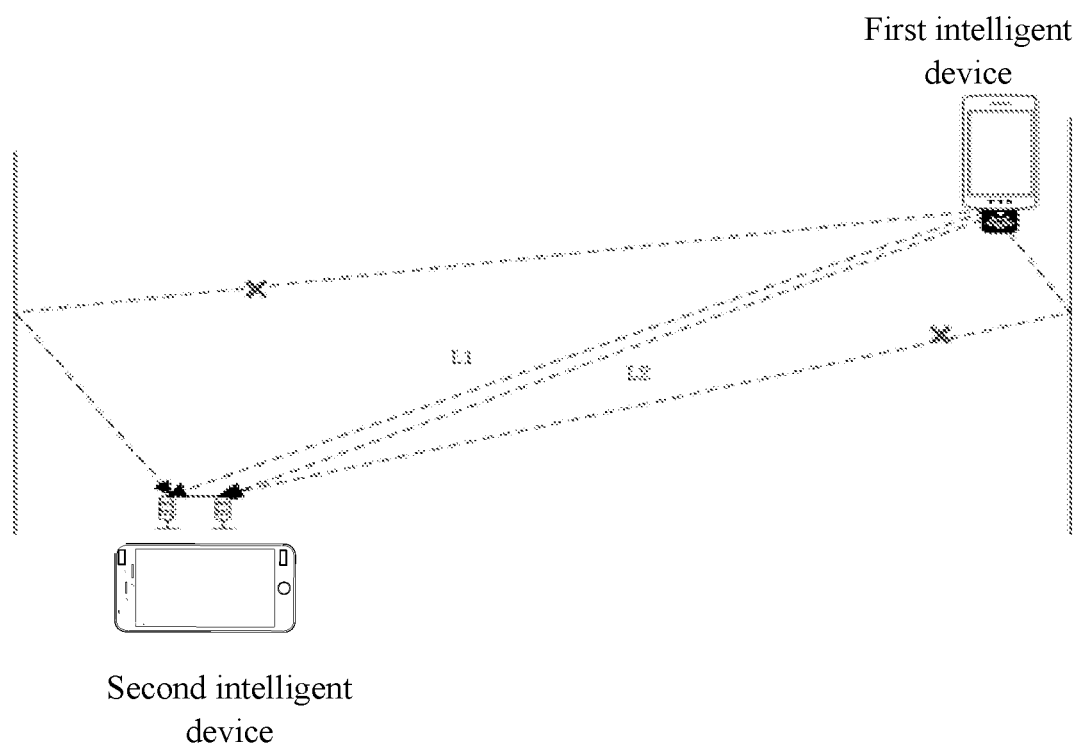
FIG. 8 illustrates a schematic diagram of relative positioning of a first intelligent device and a second intelligent device according to the present application.
Figure 11:
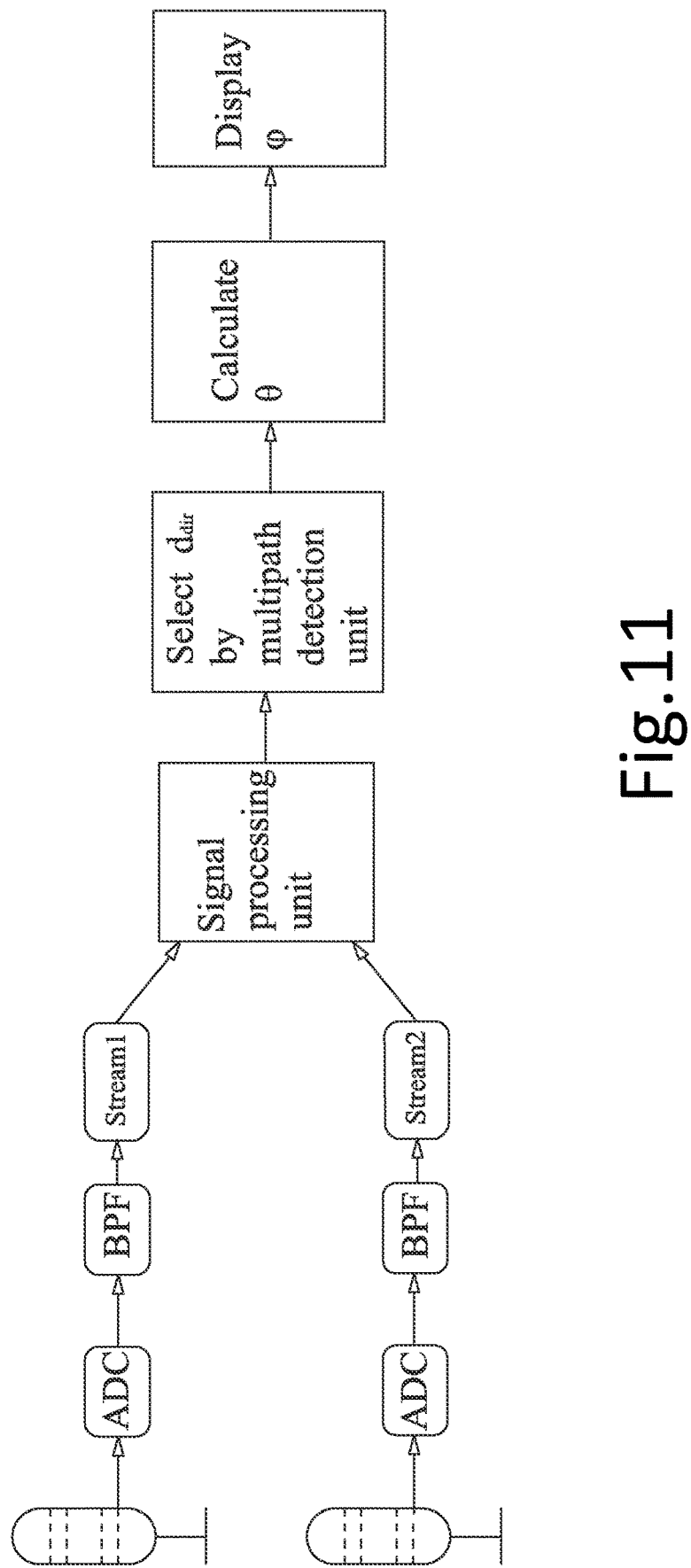
FIG. 11 illustrates an exemplary processing flowchart of relative positioning between intelligent devices according to the present application.

FIG. 8 illustrates a schematic diagram of relative positioning of a first intelligent device and a second intelligent device according to the present application. FIG. 11 illustrates an exemplary processing flowchart of relative positioning between intelligent devices according to the present application. An Analog-to-Digital Converter (ADC) is a device that converts analog signals of continuous variables into discrete digital signals. A Band-Pass Filter (BPF) is a device that allows waves of a specific frequency band to pass through and shields other frequency bands at the same time. A process of identifying a relative direction between two intelligent devices based on ultrasound includes the following steps:

In step 1, a first intelligent device transmits a positioning signal in an ultrasonic format, which includes an MAC address of the first intelligent device.

In step 2, two microphones of a second intelligent device respectively detect the positioning signal, resolve the MAC address from the positioning signal respectively detected thereby, and confirm that the positioning signal respectively detected thereby comes from the same sound source based on the MAC address.

In step 3, the second intelligent device calculates a distance difference between two directly reaching signals based on a time difference between the two directly reaching signals respectively detected by the two microphones in the positioning signal.

In step 4, the second intelligent device calculates $$\theta = \arcsin\left(\frac{d}{D}\right),$$

the signal incidence angle is $$\varphi = \frac{\pi}{2} - \theta,$$

φ is the relative angle between the first intelligent device and the second intelligent device, and D is the distance between the two microphones in the second intelligent device.

Figure 9:
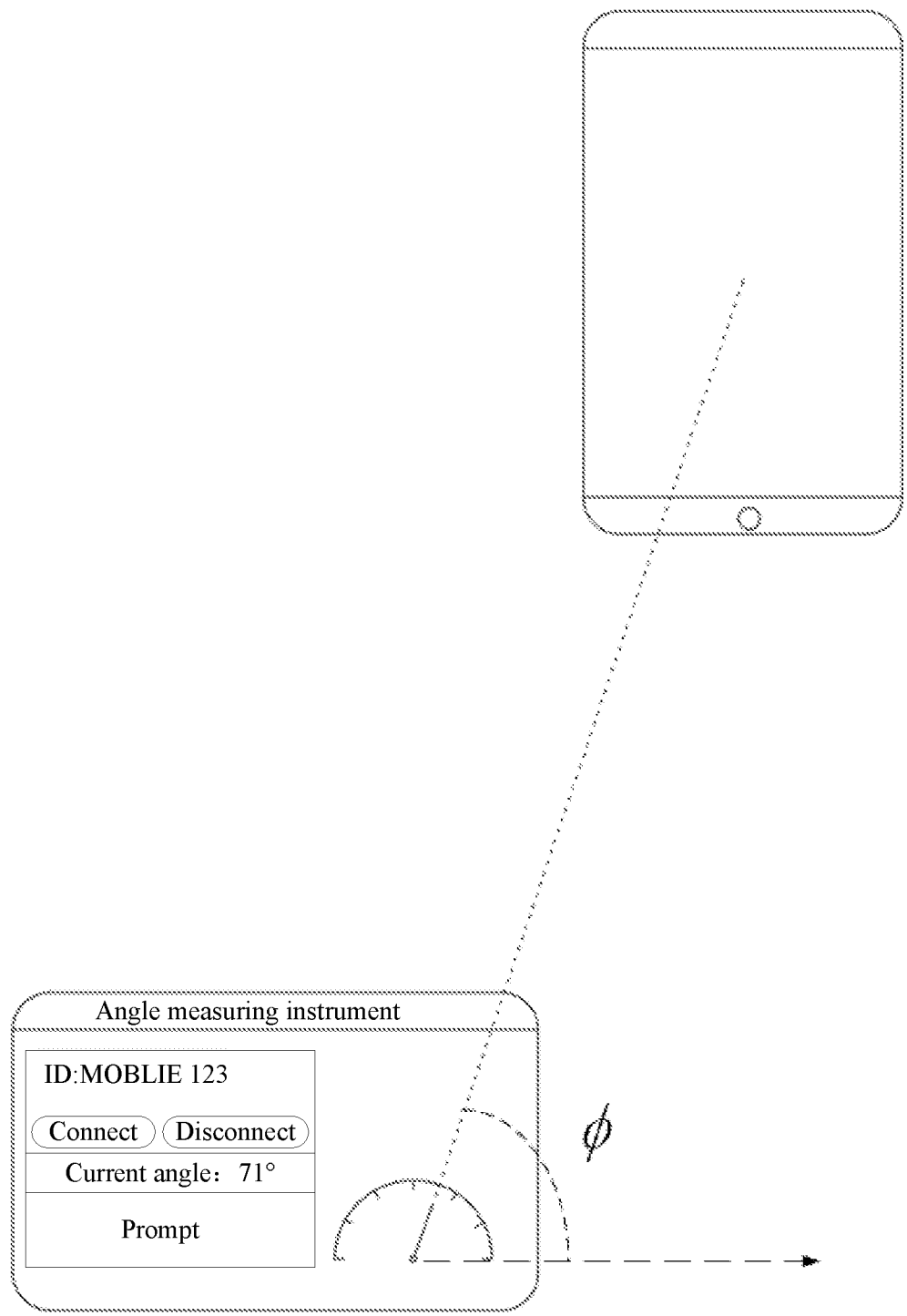
FIG. 9 illustrates a schematic diagram of displaying a relative angle in an interface of an intelligent device according to the present application.

In step 5, the second intelligent device displays the relative angle φ on its own display interface, so as to prompt the user the relative direction of the first intelligent device. For example, FIG. 9 illustrates a schematic diagram of displaying a relative angle in an interface of an intelligent device according to the present application.

For example, it is assumed that in the environment illustrated in FIG. 8, the first intelligent device is specifically implemented as an intelligent speaker, and the second intelligent device is specifically implemented as an intelligent phone.

In step 1, an intelligent speaker transmits an ultrasonic signal, which includes an MAC address of the intelligent speaker and is a signal based on CDMA architecture.

In step 2, two microphone arrays of an intelligent phone receive the ultrasonic signal and the MAC address of the intelligent speaker is resolved. At the same time, the intelligent phone calculates a distance difference between two directly reaching signals received by the two microphone arrays. It is assumed that there are directly reaching signals with signal strength peak greater than a threshold T in the respective received signal stream 1 and stream 2 respectively received by the two microphone arrays, so principle 1 is satisfied. Then, it is assumed that a reaching time difference between the two directly reaching signals is $$\Delta t = \frac{2}{48000}(s),$$

d corresponding to $\Delta t$ is calculated, where $$d = \frac{2}{48000} * 340 \approx 0.014(m).$$

The distance D between the two microphones is known (i.e., the length of the phone), which is assumed to be 0.145 m. Accordingly, it can be seen that d is less than D, so principle 2 is satisfied. Therefore, the two directly reaching signals can be selected to calculate the relative angle, where d=0.014 (m).

In step 3, the intelligent phone calculates $$\theta = \arcsin\left(\frac{d}{D}\right) = \arcsin\left(\frac{0.014}{0.145}\right) \approx 5.6°,$$

so the signal incidence angle is $$\varphi = \frac{\pi}{2} - \theta = 84.4°,$$

and the intelligent phone displays angle 84.4° on its own display screen, that is, the intelligent speaker is in a direction at an angle of 84.4° relative to the intelligent phone.

Figure 10:
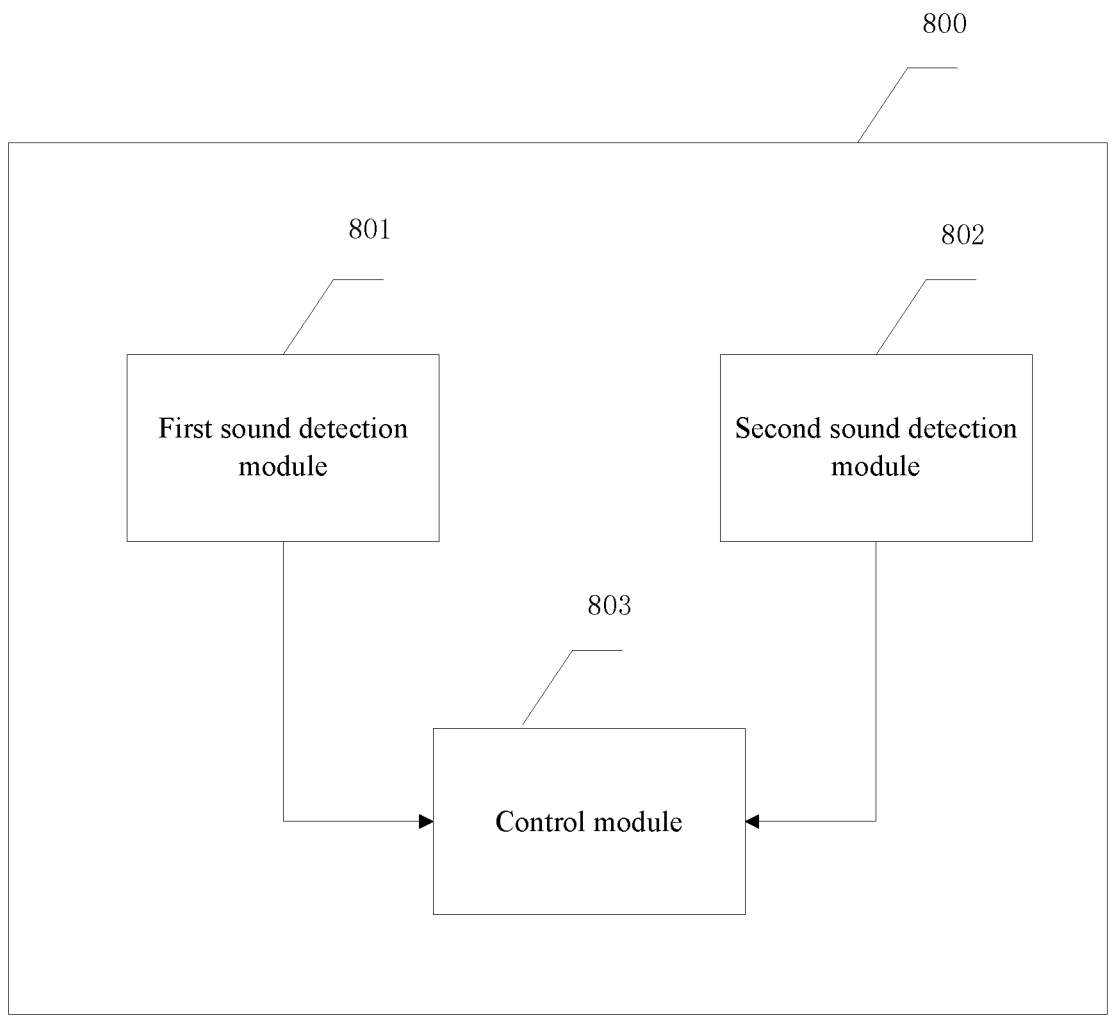
FIG. 10 illustrates a diagram of functional modules of an intelligent device according to the present application.

Based on the above description, the present application further provides an intelligent device. FIG. 10 illustrates a diagram of functional modules according to the present application.

Referring to FIG. 10, an intelligent device 800 includes:
a first sound detection module 801 configured to detect a first sound signal sent by a second intelligent device and directly reaching the first sound detection module;
a second sound detection module 802 configured to detect a second sound signal sent by the second intelligent device and directly reaching the second sound detection module, wherein the first sound signal and the second sound signal are sent by the second intelligent device at the same time;
a control module 803 configured to determine a time difference between the receiving time of the first sound signal and the receiving time of the second sound signal, and determine a relative angle between the first intelligent device and the second intelligent device based on the distance between the first sound detection module and the second sound detection module and the time difference.

In one embodiment, the control module 803 is configured to determine θ based on $$\theta = \arcsin\left(\frac{d}{D}\right),$$

where arcsin is an inverse sine function, d=t*c, t is the time difference, c is the propagation speed of sound, and D is the distance between the first sound detection module 801 and the second sound detection module 802; determine the relative angle φ between the first intelligent device and the second intelligent device based on θ, where $$\varphi = \frac{\pi}{2} - \theta.$$

In one embodiment, the control module 803 is configured to determine a sound signal with strength greater than a predetermined threshold within a predetermined time window in a sound signal stream sent by the second intelligent device and received by the first sound detection module 801 as the first sound signal; determine a sound signal with strength greater than the predetermined threshold within the predetermined time window in a sound signal stream sent by the second intelligent device and received by the second sound detection module 802 as the second sound signal.

In one embodiment, the control module 803 is configured to determine sound signals with strength greater than a predetermined threshold in a sound signal stream sent by the second intelligent device and detected by the first sound detection module 801 to form a first candidate signal set; determine sound signals with strength greater than the predetermined threshold in a sound signal stream sent by the second intelligent device and detected by the second sound detection module 802 to form a second candidate signal set; determine a respective time difference between the receiving time of each sound signal in the first candidate signal set and the receiving time of each sound signal in the second candidate signal set; determine a pair of sound signals with the time difference smaller than M as the first sound signal and the second sound signal, where M=(D/c), D is the distance between the first sound detection module and the second sound detection module, and c is the propagation speed of sound.

In one embodiment, the first sound signal and the second sound signal are ultrasonic waves in a code division multiple access format and include a media access control address of the second intelligent device.

In one embodiment, the first sound detection module 801 and the second sound detection module 802 are respectively disposed at two opposite ends of the intelligent device 800 in a length direction, width direction or height direction; the intelligent device 800 includes at least one of an intelligent phone, a tablet PC, an intelligent watch, an intelligent bracelet, an intelligent speaker, an intelligent TV, an intelligent earphone, an intelligent robot, etc. The first sound detection module 801 and the second sound detection module 802 may be respectively implemented as a microphone or a microphone array.

The present application further provides a device for determining a relative angle between intelligent devices. The device is applicable to a first intelligent device. The device includes: an enabling module configured to enable a first sound detection module to detect a first sound signal sent by a second intelligent device and directly reaching the first sound detection module, and enable a second sound detection module to detect a second sound signal sent by the second intelligent device and directly reaching the second sound detection module, wherein the first sound signal and the second sound signal are sent by the second intelligent device at the same time; a time difference determination module configured to determine a time difference between the receiving time of the first sound signal and the receiving time of the second sound signal; an angle determination module configured to determine a relative angle between the first intelligent device and the second intelligent device based on the distance between the first sound detection module and the second sound detection module and the time difference.

In one embodiment, the angle determination module is configured to determine θ based on $$\theta = \arcsin\left(\frac{d}{D}\right),$$

where arcsin is an inverse sine function, d=t*c, t is the time difference, c is the propagation speed of sound, and D is the distance between the first sound detection module and the second sound detection module; determine the relative angle φ between the first intelligent device and the second intelligent device based on θ, where $$\varphi = \frac{\pi}{2} - \theta.$$

In one embodiment, the enabling module is configured to: determine a sound signal with strength greater than a predetermined threshold within a predetermined time window in a sound signal stream sent by the second intelligent device and received by the first sound detection module as the first sound signal; determine a sound signal with strength greater than the predetermined threshold within the predetermined time window in a sound signal stream sent by the second intelligent device and received by the second sound detection module as the second sound signal; or determine sound signals with strength greater than a predetermined threshold in a sound signal stream sent by the second intelligent device and detected by the first sound detection module to form a first candidate signal set; determine sound signals with strength greater than the predetermined threshold in a sound signal stream sent by the second intelligent device and detected by the second sound detection module to form a second candidate signal set; determine a respective time difference between the receiving time of each sound signal in the first candidate signal set and the receiving time of each sound signal in the second candidate signal set; determine a pair of sound signals with the time difference smaller than M as the first sound signal and the second sound signal, where M=(D/c), D is the distance between the first sound detection module and the second sound detection module, and c is the propagation speed of sound.

The present application further provides a system for determining a relative angle between intelligent devices. The system includes: a second intelligent device configured to send an ultrasonic signal; a first intelligent device including a first sound detection module and a second sound detection module, and configured to determine first time that the ultrasonic signal directly reaches the first sound detection module; determine second time that the ultrasonic signal directly reaches the second sound detection module; determine a time difference between the first time and the second time; determine a relative angle between the first intelligent device and the second intelligent device based on the distance between the first sound detection module and the second sound detection module and the time difference.

Exemplarily, the intelligent device according to the present application has mobility. Based on the above description, the present application further provides a mobile terminal which can determine a relative angle relative to other intelligent devices.

Figure 12:
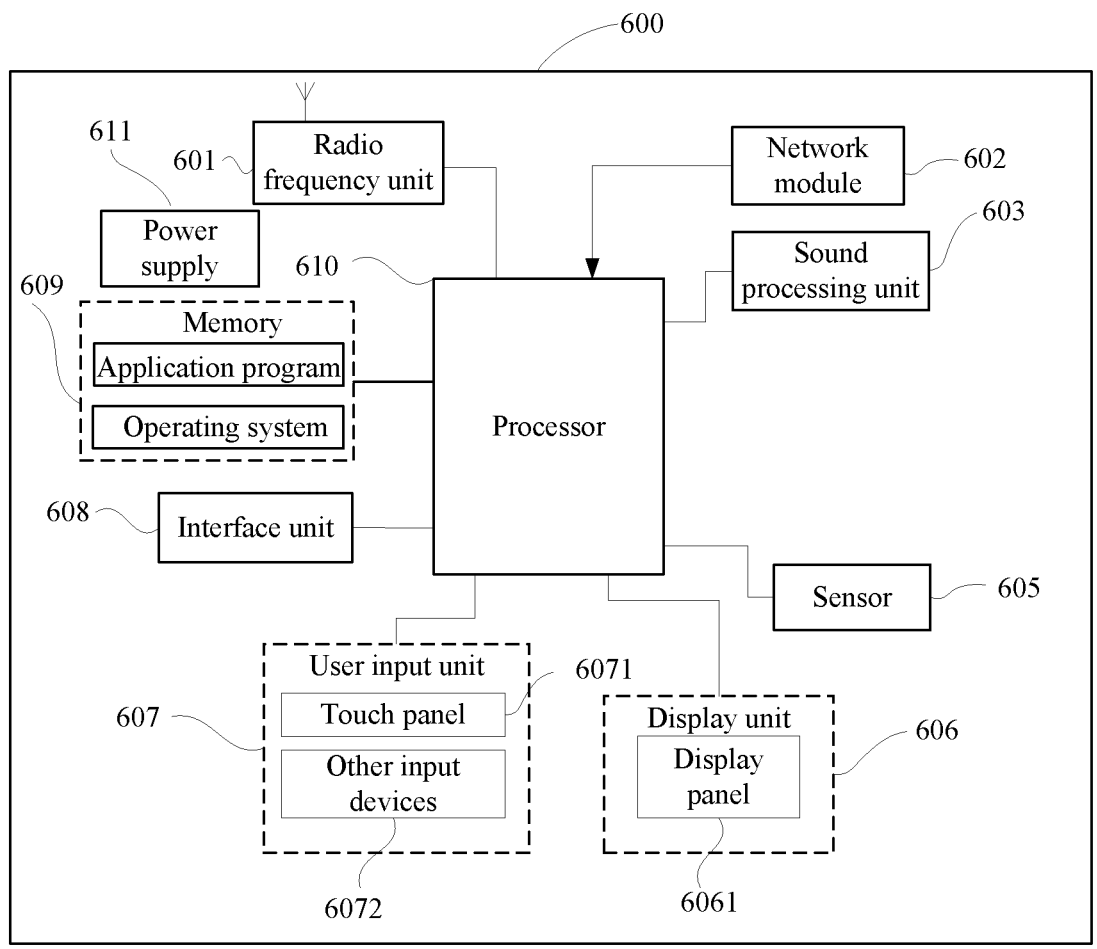
FIG. 12 illustrates an exemplary structural diagram when an intelligent device is implemented as a mobile terminal according to the present application.

FIG. 12 illustrates an exemplary structural diagram when an intelligent device is implemented as a mobile terminal according to the present application.

Referring to FIG. 12, a mobile terminal 600 includes but is not limited to a radio frequency unit 601, a network module 602, a sound processing unit 603, an input unit 604, a sensor 605, a display unit 606, a user trigger unit 607, an interface unit 608, a memory 609, a processor 610, and a power supply 611. It further includes a computer program stored on the memory and can run on the processor. When the computer program is executed by the processor, it implements the steps of the method for determining a relative angle between intelligent devices. Those skilled in the art can understand that the mobile terminal structure illustrated in FIG. 12 does not constitute a limitation to the mobile terminal, and the mobile terminal may include more or fewer components than illustrated in the drawing, or some components or different component arrangements may be combined. In the embodiment of the present application, the mobile terminal 600 includes but is not limited to a mobile phone, a tablet computer, a laptop, a handheld computer, a vehicle-mounted terminal, a wearable device, a pedometer, etc. The processor 610 is at least configured to implement the steps of the method for determining a relative angle between intelligent devices in the above embodiment of the present application. It should be understood that, in the embodiment of the present application, the radio frequency unit 601 may be configured to receive and transmit signals in the process of sending and receiving information or calling. Specifically, the radio frequency unit 601 receives downlink data from a base station and gives it to the processor 610 for processing. In addition, the radio frequency unit 601 transmits uplink data to the base station. Generally, the radio frequency unit 601 includes but is not limited to an antenna, at least one amplifier, a transceiver, a coupler, a low-noise amplifier, a duplexer, and the like. In addition, the radio frequency unit 601 can also communicate with networks and other devices through a radio communication system. The mobile terminal provides users with wireless broadband Internet access through the network module 602. For example, it helps users send and receive e-mail, browse web pages and access streaming media. The sound processing unit 603 can convert audio data received by the radio frequency unit 601 or the network module 602 or stored in the memory 609 into an audio signal and output it as sound. Exemplarily, it sends ultrasonic waves with its MAC address, and may also receive ultrasonic waves. The sound processing unit 603 may include two microphone arrays disposed at an interval, and each microphone array can transmit and receive sound (such as positioning signals in an ultrasonic format). The mobile terminal 600 further includes at least one sensor 605, for example, a light sensor, a motion sensor, and other sensors. Specifically, the light sensor includes an ambient light sensor and a proximity sensor. The ambient light sensor can adjust the brightness of a display panel 6061 according to the brightness of the ambient light. The proximity sensor can turn off the display panel 6061 and/or backlight when the mobile terminal 600 moves to the ear. As a kind of motion sensor, an accelerometer sensor can detect the acceleration in all directions (generally three axes), and can detect the magnitude and direction of gravity when it is stationary. It may be configured to identify the attitude of the mobile terminal (such as horizontal and vertical screen switching, related games, and magnetometer attitude calibration), vibration identification related functions (such as pedometer, knocking), etc. The sensor 605 may further include a fingerprint sensor, a pressure sensor, an iris sensor, a molecular sensor, a gyroscope, a barometer, a hygrometer, a thermometer, an infrared sensor, etc., which will not be repetitively described here. The display unit 606 is configured to display information triggered by the user or information provided to the user. The display unit 106 may include a display panel 6061, which may be configured in the form of Liquid Crystal Display (LCD), Organic Light-Emitting Diode (OLED), etc. The user trigger unit 607 may be configured to receive input digital or character information and generate key signal input related to user setting and function control of the mobile terminal. Specifically, the user trigger unit 607 includes a touch panel 6071 and other input devices 6072. The touch panel 6071, also known as the touch screen, can collect the user's touch operations on or near it (such as the user's operations on or near the touch panel 6071 using any suitable object or accessory such as finger and stylus). The touch panel 6071 may include a touch detection device and a touch controller. The touch detection device detects the user's touch orientation, detects a signal brought by the touch operation, and transmits the signal to the touch controller. The touch controller receives the touch information from the touch detection device, converts it into contact coordinates, then sends it to the processor 610, receives an instruction sent by the processor 610 and executes it. In addition, the touch panel 6071 may be implemented by various types such as resistive type, capacitive type, infrared ray and surface acoustic wave. In addition to the touch panel 6071, the user trigger unit 607 may further include other input devices 6072. Specifically, other input devices 6072 may include but are not limited to a physical keyboard, function keys (such as volume control keys and switch keys), a trackball, a mouse and a joystick, which will not be repetitively described here. Further, the touch panel 6071 may cover the display panel 6061. When the touch panel 6071 detects a touch operation on or near it, it transmits the touch operation to the processor 610 to determine the type of the touch event, and then the processor 610 provides corresponding visual output on the display panel 6061 according to the type of the touch event. Although in FIG. 12, the touch panel 6071 and the display panel 6061 are configured as two independent components to realize the input and output functions of the mobile terminal, in some embodiments, the touch panel 6071 and the display panel 6061 may be integrated to realize the input and output functions of the mobile terminal, which are not limited here. The interface unit 608 is an interface between an external device and the mobile terminal 600. For example, an external device may include a wired or wireless headset port, an external power supply (or battery charger) port, a wired or wireless data port, a memory card port, a port for connecting a device with an identification module, an audio input/output (I/O) port, a video I/O port, a headset port, and the like. The interface unit 608 may be configured to receive input from an external device (for example, data information, power, etc.) and transmit the received input to one or more elements within the mobile terminal 600, or may be configured to transmit data between the mobile terminal 600 and the external device. The memory 609 may be configured to store software programs and various data. The memory 609 may mainly include a program storage area and a data storage area. The program storage area can store an operating system, an application program required for at least one function (for example, sound playback function, image playback function, etc.). The data storage area can store data created according to the use of the mobile phone (for example, audio data, phonebook, etc.). In addition, the memory 609 may include a high-speed random access memory and may further include a nonvolatile memory, such as at least one disk storage device, flash memory device, or other volatile solid-state storage device. The processor 610 is the control center of the mobile terminal, uses various interfaces and lines to connect various parts of the whole mobile terminal, executes various functions and processes data of the mobile terminal by running or executing software programs and/or modules stored in the memory 609, and calling data stored in the memory 609, so as to monitor the mobile terminal as a whole. The processor 610 may include one or more processing units. Exemplarily, the processor 610 may be integrated with an application processor and a modulation and demodulation processor. The application processor mainly processes the operating system, user interface and application program. The modulation and demodulation processor mainly processes radio communication. It can be understood that the modulation and demodulation processor may not be integrated into the processor 610. The mobile terminal 600 may further include a power supply 611 (such as a battery) that supplies power to various components. Exemplarily, the power supply 611 may be logically connected to the processor 610 through a power management system, so as to realize the functions of charging and discharging management, power consumption management and so on through the power management system. In addition, the mobile terminal 600 includes some functional modules not shown, which will not be repetitively described here.

The present application further provides a computer-readable storage medium. A computer program is stored on the computer-readable storage medium. The computer program, when executed by the processor, implements each process implemented by the processor 610 in the above embodiments of the present application, and can achieve the same technical effect. In order to avoid repetition, it will not be repetitively described here. The computer-readable storage medium may be, for example, a Read Only Memory (ROM), a Random Access Memory (RAM), a magnetic disc or optical disc.

It should be noted that the terms "include", "comprise" or any other variation thereof are intended to cover non-exclusive inclusion, so that a process, method, article or device including a series of elements includes not only those elements, but also other elements not explicitly listed, or elements inherent in such process, method, article or device. Without further restrictions, the element defined by the statement "including a . . . " does not exclude the existence of another same element in the process, method, article or device including the element.

Through the description of the above embodiments, those skilled in the art can clearly understand that the above embodiment method may be implemented by means of software and necessary general hardware platform. Of course, it may also be implemented by hardware, but in many cases, the former is a better embodiment. Based on this understanding, the technical solution of the present application in essence or the part that contributes to the prior art can be embodied in the form of a software product, which is stored in a storage medium (such as ROM/RAM, magnetic disc and optical disc) and includes several instructions to enable a terminal (which may be a mobile phone, a computer, a server, an air conditioner, or a network device) to execute the methods described in various embodiments of the present application.

The embodiments of the present application are described above with reference to the drawings, but the present application is not limited to the above specific embodiments. The above specific embodiments are only exemplary rather than restrictive. Under the inspiration of the present application, those skilled in the art may make many variations without departing from the essence of the present application and the scope set forth in the claims, which, however, still fall within the scope of protection of the present application.

The invention claimed is:

1. A method for determining a relative angle between intelligent devices, wherein the method is applicable to a first intelligent device, the first intelligent device comprises a first sound detection module and a second sound detection module, and the method comprises: enabling the first sound detection module to detect a first sound signal sent by a second intelligent device and directly reaching the first sound detection module, and enabling the second sound detection module to detect a second sound signal sent by the second intelligent device and directly reaching the second sound detection module, wherein the first sound signal and the second sound signal are sent by the second intelligent device at the same time; determining a time difference between the receiving time of the first sound signal and the receiving time of the second sound signal; determining a relative angle between the first intelligent device and the second intelligent device based on the distance between the first sound detection module and the second sound detection module and the time difference; wherein the method further comprises: determining a sound signal with strength greater than a predetermined threshold within a predetermined time window in a sound signal stream sent by the second intelligent device and received by the first sound detection module as the first sound signal; determining a sound signal with strength greater than the predetermined threshold within the predetermined time window in a sound signal stream sent by the second intelligent device and received by the second sound detection module as the second sound signal; determining a pair of sound signals with the time difference smaller than M as the first sound signal and the second sound signal, where M=(D/c), D is the distance between the first sound detection module and the second sound detection module, and c is the propagation speed of sound.

2. The method for determining a relative angle between intelligent devices according to claim 1, wherein the step of determining the relative angle between the first intelligent device and the second intelligent device comprises:

determining θ based on $$\theta = \arcsin\left(\frac{d}{D}\right),$$

where arcsin is an inverse sine function, d=t*c, t is the time difference, c is the propagation speed of sound, and D is the distance between the first sound detection module and the second sound detection module;

determining the relative angle φ between the first intelligent device and the second intelligent device based on θ, where $$\varphi = \frac{\pi}{2} - \theta.$$

3. A method for determining a relative angle between intelligent devices, wherein the method is applicable to a first intelligent device, the first intelligent device comprises a first sound detection module and a second sound detection module, and the method comprises:

enabling the first sound detection module to detect a first sound signal sent by a second intelligent device and directly reaching the first sound detection module, and enabling the second sound detection module to detect a second sound signal sent by the second intelligent device and directly reaching the second sound detection module, wherein the first sound signal and the second sound signal are sent by the second intelligent device at the same time;

determining a time difference between the receiving time of the first sound signal and the receiving time of the second sound signal;

determining a relative angle between the first intelligent device and the second intelligent device based on the distance between the first sound detection module and the second sound detection module and the time difference, wherein the method further comprises:

determining sound signals with strength greater than a predetermined threshold in a sound signal stream sent by the second intelligent device and detected by the first sound detection module to form a first candidate signal set;

determining sound signals with strength greater than the predetermined threshold in a sound signal stream sent by the second intelligent device and detected by the second sound detection module to form a second candidate signal set;

determining a respective time difference between the receiving time of each sound signal in the first candidate signal set and the receiving time of each sound signal in the second candidate signal set;

determining a pair of sound signals with the time difference smaller than M as the first sound signal and the second sound signal, where M=(D/c), D is the distance between the first sound detection module and the second sound detection module, and c is the propagation speed of sound.

4. The method for determining a relative angle between intelligent devices according to claim 1, wherein the first sound signal and the second sound signal are ultrasonic waves in a code division multiple access format and comprise a media access control address of the second intelligent device.

5. An intelligent device, wherein the intelligent device comprises: a first sound detection module configured to detect a first sound signal sent by a second intelligent device and directly reaching the first sound detection module; a second sound detection module configured to detect a second sound signal sent by the second intelligent device and directly reaching the second sound detection module, wherein the first sound signal and the second sound signal are sent by the second intelligent device at the same time; a control module configured to determine a time difference between the receiving time of the first sound signal and the receiving time of the second sound signal, and determine a relative angle between the first intelligent device and the second intelligent device based on the distance between the first sound detection module and the second sound detection module and the time difference; the control module is configured to determine a sound signal with strength greater than a predetermined threshold within a predetermined time window in a sound signal stream sent by the second intelligent device and received by the first sound detection module as the first sound signal; determine a sound signal with strength greater than the predetermined threshold within the predetermined time window in a sound signal stream sent by the second intelligent device and received by the second sound detection module as the second sound signal; determining a pair of sound signals with the time difference smaller than M as the first sound signal and the second sound signal, where M=(D/c), D is the distance between the first sound detection module and the second sound detection module, and c is the propagation speed of sound.

6. The intelligent device according to claim 5, wherein the control module is configured to determine θ based on $$\theta = \arcsin\left(\frac{d}{D}\right),$$

where arcsin is an inverse sine function, d=t #c, t is the time difference, c is the propagation speed of sound, and D is the distance between the first sound detection module and the second sound detection module; determine the relative angle φ between the first intelligent device and the second intelligent device based on θ, where $$\varphi = \frac{\pi}{2} - \theta.$$

7. An intelligent device, wherein the intelligent device comprises:
a first sound detection module configured to detect a first sound signal sent by a second intelligent device and directly reaching the first sound detection module;
a second sound detection module configured to detect a second sound signal sent by the second intelligent device and directly reaching the second sound detection module, wherein the first sound signal and the second sound signal are sent by the second intelligent device at the same time;
a control module configured to determine a time difference between the receiving time of the first sound signal and the receiving time of the second sound signal, and determine a relative angle between the first intelligent device and the second intelligent device based on the distance between the first sound detection module and the second sound detection module and the time difference, wherein the control module is configured to determine sound signals with strength greater than a predetermined threshold in a sound signal stream sent by the second intelligent device and detected by the first sound detection module to form a first candidate signal set; determine sound signals with strength greater than the predetermined threshold in a sound signal stream sent by the second intelligent device and detected by the second sound detection module to form a second candidate signal set; determine a respective time difference between the receiving time of each sound signal in the first candidate signal set and the receiving time of each sound signal in the second candidate signal set; determine a pair of sound signals with the time difference smaller than M as the first sound signal and the second sound signal, where M=(D/c), D is the distance between the first sound detection module and the second sound detection module, and c is the propagation speed of sound.

8. The intelligent device according to claim 5, wherein the first sound signal and the second sound signal are ultrasonic waves in a code division multiple access format and comprise a media access control address of the second intelligent device.

9. The intelligent device according to claim 5, wherein the first sound detection module and the second sound detection module are respectively disposed at two opposite ends of the intelligent device in a length direction, width direction or height direction; the intelligent device comprises at least one of an intelligent phone, a tablet PC, an intelligent watch, an intelligent bracelet, an intelligent speaker, an intelligent TV, an intelligent earphone, and an intelligent robot.

10. A system for determining a relative angle between intelligent devices, wherein the system comprises: a second intelligent device configured to send an ultrasonic signal; a first intelligent device comprising a first sound detection module and a second sound detection module, and configured to determine first time that the ultrasonic signal directly reaches the first sound detection module; determine second time that the ultrasonic signal directly reaches the second sound detection module; determine a time difference between the first time and the second time; determine a relative angle between the first intelligent device and the second intelligent device based on the distance between the first sound detection module and the second sound detection module and the time difference; wherein the first intelligent is further configured to: determine sound signals with strength greater than a predetermined threshold in a sound signal stream sent by the second intelligent device and detected by the first sound detection module to form a first candidate signal set; determine sound signals with strength greater than the predetermined threshold in a sound signal stream sent by the second intelligent device and detected by the second sound detection module to form a second candidate signal set; determine a respective time difference between the receiving time of each sound signal in the first candidate signal set and the receiving time of each sound signal in the second candidate signal set; determine a pair of sound signals with the time difference smaller than M as the first sound signal and the second sound signal, where M=(D/c), D is the distance between the first sound detection module and the second sound detection module, and c is the propagation speed of sound.

11. An intelligent device, wherein the intelligent device comprises a processor, a memory and a computer program stored on the memory and running on the processor, and the computer program, when executed by the processor, implements the method for determining a relative angle between intelligent devices according to claim 1.

12. A non-transitory computer-readable storage medium, wherein a computer program is stored on the computer-readable storage medium, and the computer program, when executed by a processor, implements the method for determining a relative angle between intelligent devices according to claim 1.

13. The method for determining a relative angle between intelligent devices according to claim 2, wherein the first sound signal and the second sound signal are ultrasonic waves in a code division multiple access format and comprise a media access control address of the second intelligent device.

14. The method for determining a relative angle between intelligent devices according to claim 3, wherein the first sound signal and the second sound signal are ultrasonic waves in a code division multiple access format and comprise a media access control address of the second intelligent device.

15. The intelligent device according to claim 6, wherein the first sound signal and the second sound signal are ultrasonic waves in a code division multiple access format and comprise a media access control address of the second intelligent device.

16. The intelligent device according to claim 7, wherein the first sound signal and the second sound signal are ultrasonic waves in a code division multiple access format and comprise a media access control address of the second intelligent device.

17. The intelligent device according to claim 6, wherein the first sound detection module and the second sound detection module are respectively disposed at two opposite ends of the intelligent device in a length direction, width direction or height direction; the intelligent device comprises at least one of an intelligent phone, a tablet PC, an intelligent watch, an intelligent bracelet, an intelligent speaker, an intelligent TV, an intelligent earphone, and an intelligent robot.

18. The intelligent device according to claim 7, wherein the first sound detection module and the second sound detection module are respectively disposed at two opposite ends of the intelligent device in a length direction, width direction or height direction; the intelligent device comprises at least one of an intelligent phone, a tablet PC, an intelligent watch, an intelligent bracelet, an intelligent speaker, an intelligent TV, an intelligent earphone, and an intelligent robot.

19. An intelligent device, wherein the intelligent device comprises a processor, a memory and a computer program stored on the memory and running on the processor, and the computer program, when executed by the processor, implements the method for determining a relative angle between intelligent devices according to claim 2.

20. An intelligent device, wherein the intelligent device comprises a processor, a memory and a computer program stored on the memory and running on the processor, and the computer program, when executed by the processor, implements the method for determining a relative angle between intelligent devices according to claim 4.

21. An intelligent device, wherein the intelligent device comprises a processor, a memory and a computer program stored on the memory and running on the processor, and the computer program, when executed by the processor, implements the method for determining a relative angle between intelligent devices according to claim 4.

22. A non-transitory computer-readable storage medium, wherein a computer program is stored on the computer-readable storage medium, and the computer program, when executed by a processor, implements the method for determining a relative angle between intelligent devices according to claim 2.

23. A non-transitory computer-readable storage medium, wherein a computer program is stored on the computer-readable storage medium, and the computer program, when executed by a processor, implements the method for determining a relative angle between intelligent devices according to claim 3.

24. A non-transitory computer-readable storage medium, wherein a computer program is stored on the computer-readable storage medium, and the computer program, when executed by a processor, implements the method for determining a relative angle between intelligent devices according to claim 4.

\* \* \* \* \*